United States Patent
Lockhart et al.

(10) Patent No.: US 11,646,027 B2
(45) Date of Patent: May 9, 2023

(54) MULTI-LAYER KEYWORD DETECTION

(71) Applicant: Amazon Technologies, Inc., Seattle, WA (US)

(72) Inventors: Christopher Wayne Lockhart, Louisville, KY (US); Matthew Joseph Cole, Arlington, MA (US); Xulei Liu, Brighton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/590,406

(22) Filed: Feb. 1, 2022

(65) Prior Publication Data

US 2022/0157311 A1 May 19, 2022

Related U.S. Application Data

(63) Continuation of application No. 16/783,826, filed on Feb. 6, 2020, now Pat. No. 11,250,851, which is a
(Continued)

(51) Int. Cl.
*G10L 15/02* (2006.01)
*G10L 15/08* (2006.01)
(Continued)

(52) U.S. Cl.
CPC .............. *G10L 15/22* (2013.01); *G10L 15/02* (2013.01); *G10L 15/08* (2013.01); *G10L 15/26* (2013.01);
(Continued)

(58) Field of Classification Search
CPC ......... G10L 15/02; G10L 15/08; G10L 15/22; G10L 15/26; G10L 15/30; G10L 15/32;
(Continued)

(56) References Cited

U.S. PATENT DOCUMENTS

| | | | | |
|---|---|---|---|---|
| 7,457,755 | B2 * | 11/2008 | Konig | B60R 16/0373 |
| | | | | 704/E15.045 |
| 9,225,833 | B1 * | 12/2015 | Koster | H04M 3/42221 |
| 9,659,195 | B2 * | 5/2017 | Wade | G06K 7/10297 |
| 2007/0205872 | A1 * | 9/2007 | Kim | H04W 52/0229 |
| | | | | 455/343.1 |

(Continued)

FOREIGN PATENT DOCUMENTS

| | | | | |
|---|---|---|---|---|
| AU | 2013204564 B2 * | 1/2016 | | G06F 3/01 |
| CN | 1905307 A * | 1/2007 | | G06F 1/3228 |

(Continued)

*Primary Examiner* — Daniel C Washburn
*Assistant Examiner* — Oluwadamilola M Ogunbiyi
(74) *Attorney, Agent, or Firm* — Pierce Atwood LLP

(57) ABSTRACT

A system and method for temporarily disabling keyword detection to avoid detection of machine-generated keywords. A local device may operate two keyword detectors. The first keyword detector operates on input audio data received by a microphone to capture keywords uttered by a user. In these instances, the keyword may be detected by the first detector and the audio data may be indicated for speech processing. The system may determine output audio data responsive to the input audio data. The local device may process the output audio data to determine that it also includes the keyword. The device may then disable the first keyword detector while the output audio data is played back by an audio speaker of the local device. Thus the local device may avoid detection of a keyword originating from the output audio. The first keyword detector may be reactivated after a time interval during which the keyword might be detectable in the output audio.

20 Claims, 10 Drawing Sheets

Related U.S. Application Data continuation of application No. 16/131,705, filed on Sep. 14, 2018, now Pat. No. 10,679,625, which is a continuation of application No. 15/370,216, filed on Dec. 6, 2016, now Pat. No. 10,079,015.

(51) Int. Cl.
    *G10L 15/22* (2006.01)
    *G10L 15/26* (2006.01)
    *G10L 15/30* (2013.01)
    *G10L 15/32* (2013.01)

(52) U.S. Cl.
    CPC .............. *G10L 15/30* (2013.01); *G10L 15/32* (2013.01); *G10L 2015/025* (2013.01); *G10L 2015/088* (2013.01); *G10L 2015/223* (2013.01)

(58) Field of Classification Search
    CPC ......... G10L 2015/025; G10L 2015/088; G10L 2015/223
    See application file for complete search history.

(56) References Cited

U.S. PATENT DOCUMENTS

| | | | |
|---|---|---|---|
| 2011/0062794 A1* | 3/2011 | Vergoossen | H04N 21/436 307/125 |
| 2013/0275899 A1* | 10/2013 | Schubert | B60K 35/00 715/765 |
| 2015/0340029 A1* | 11/2015 | Kunieda | G10L 15/083 704/249 |
| 2016/0171975 A1* | 6/2016 | Sun | G06F 1/3287 704/254 |
| 2016/0171976 A1* | 6/2016 | Sun | H04W 52/0251 704/254 |
| 2017/0018275 A1* | 1/2017 | Gunn | G10L 15/22 |
| 2017/0070959 A1* | 3/2017 | Khazanov | H04W 52/0235 |
| 2017/0076720 A1* | 3/2017 | Gopalan | G10L 15/22 |
| 2017/0090864 A1* | 3/2017 | Jorgovanovic | H04M 11/007 |

FOREIGN PATENT DOCUMENTS

| | | | | |
|---|---|---|---|---|
| KR | 100691175 B1 * | 3/2007 | | G06F 1/3228 |
| KR | 20130024505 A * | 3/2013 | | H04B 15/00 |
| WO | WO-2014033855 A1 * | 3/2014 | | G10L 15/08 |

\* cited by examiner

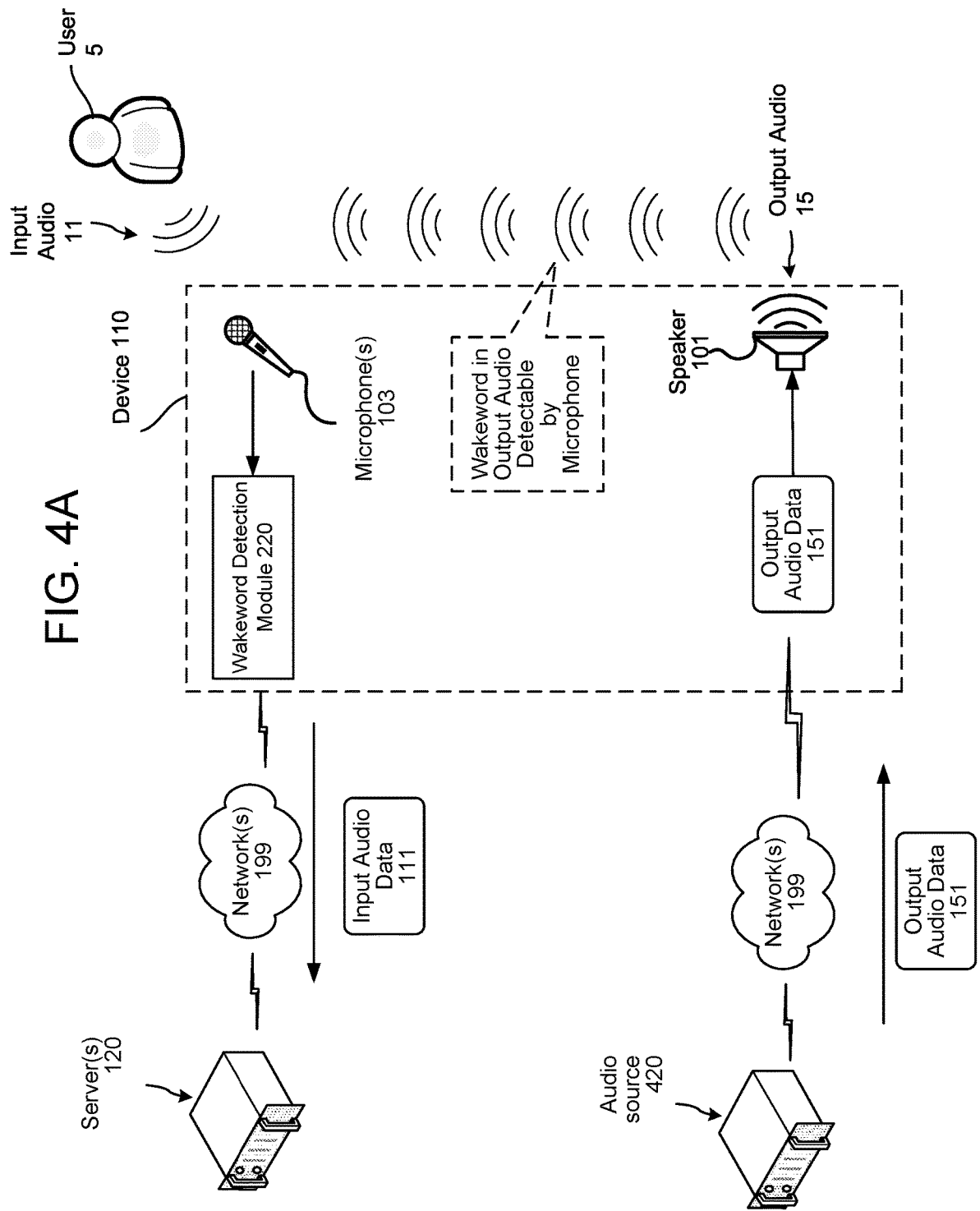

MULTI-LAYER KEYWORD DETECTION

CROSS-REFERENCE TO RELATED APPLICATION

This application claims priority to, and is a continuation of, U.S. patent application Ser. No. 16/783,826, titled "Multi-Layer Keyword Detection," filed on Feb. 6, 2020, which is a continuation of U.S. patent application Ser. No. 16/131,705, titled "Multi-Layer Keyword Detection," filed on Sep. 14, 2018, which is a continuation of U.S. patent application Ser. No. 15/370,216, titled "Multi-Layer Keyword Detection," filed on Dec. 6, 2016, and issued as U.S. Pat. No. 10,079,015. The entirety of the above applications are hereby incorporated by reference in their entireties.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4A illustrates an overview of a system that may inadvertently detect a wakeword in output audio data as a wakeword spoken by a user.

DETAILED DESCRIPTION

Figure 1:
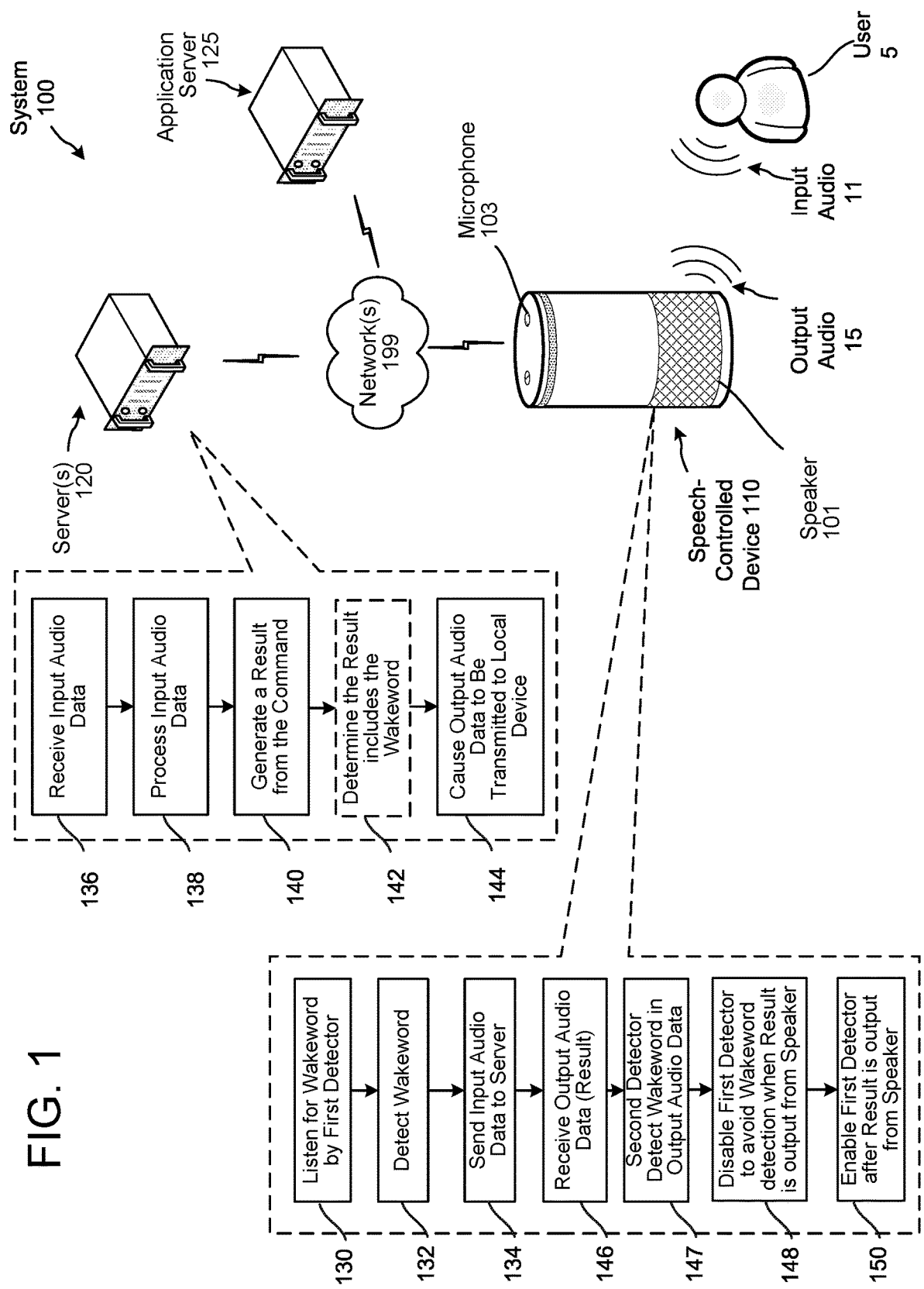
FIG. 1 illustrates an overview of a system for implementing embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus a spoken language processing system may include an ASR module that receives audio input of a user utterance and generates one or more likely transcriptions of the utterance and may also include a NLU module that receives textual input, such as a transcription of a user utterance, and determines the meaning of the text in a way that can be acted upon, such as by a computer application.

A speech processing system may be configured as a relatively self-contained system where one device captures audio, performs speech processing, and executes a command corresponding to the input speech. Alternatively, a speech processing system may be configured as a distributed system where a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive. That is, significant computing resources may be needed to process ASR and NLU processing within a reasonable time frame. Because of this, a distributed computing environment may be used to when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

As part of a distributed speech processing system, a local device may be configured to continuously send all detected input audio to a remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would send audio data corresponding to that subsequent audio to a remote device (or maintain it locally) to perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

A wakeword is an example of a specialized keyword. For a wakeword, the associated function is typically to "wake" a local device so that it may capture audio following (or surrounding) the wakeword and send audio data to a remote server for speech processing. For speech processing enabled systems, the wakeword may be the only keyword recognized by the system and all other words are processed using typical speech processing. In systems where other keywords may be enabled, each respective keyword may only be associated with a single same function that is executed regardless of the operating context of the device. For example, saying "Alexa" (a wakeword) may activate speech processing components regardless of whatever else the system is doing. In another example "shutdown" may be a configured keyword to shut off the system, also regardless of whatever else the system is doing.

One drawback to the use of a wakeword is that a system may detect the wakeword when the wakeword was detected by a local device, but was not actually spoken by the user with the intention of controlling the device. This may occur because a local device may use techniques to allow for the detection of wakewords from multiple users and may not be able to distinguish between the actual user and wakewords from other sources, including potentially instances of the wakeword output by the local device itself. For example, if the device detects the wakeword followed by a command, then generates a result audio output in response to processing the command (such as playing music, opening a call with another user, outputting a news report, or the like), the wakeword may be included in the resulting output audio (e.g., the song, news report, etc.). If output audio data is actually output as an audio wave from the output audio speaker of the device, the inadvertent wakeword (e.g., the wakeword originating from the output audio data rather than from the user) may be detected by the microphone(s) of the device and processed as if it were an intended wakeword. Thus, if the inadvertent wakeword is detected by the device, the device may not necessarily know if the wakeword was spoken by the user or originated from the audio speaker of the device (illustrated as component 101 in FIG. 1 below). As a result, the device may inadvertently halt its operation or attempt to listen for, detect and process a new command, even if such control of the device was not intended. For present discussion, a wakeword that is detected by a device, but should not be used to control the device, is referred to as an inadvertent wakeword. A command following a wakeword that is detected by a device, but should not be used to control the device, is referred to as an inadvertent command.

One example of such an inadvertent wakeword is a wakeword that is output as part of or included in output audio played in response to a command that was input to a local device. For example, the local device may detect a wakeword and a command following the wakeword. The command may be processed and may result in output audio data that includes the wakeword. Such output audio data may include a news report, television show, advertisement, call with another device, or any other audio content, wherein the audio content includes the wakeword. Once generated or produced, the output audio data including the inadvertent wakeword may be sent to the local device to be output from output audio speakers connected to the local device. In order to avoid inadvertent wakeword detection, the local device may be configured to disable wakeword detection during the time in which the wakeword will be output from the speakers and detectable by a microphone. Such a configuration may involve multiple wakeword detectors, as explained below.

To avoid responding to an inadvertent wakeword generated by the device and executing an inadvertent audible command (for example, those of advertisements, broadcasts, etc.), the device may temporarily disable wakeword detection during playback of output audio data. The device may also temporarily disable wakeword detection during a time interval when the wakeword will be audibly output from the device. During normal operation, a local device may perform wakeword detection, wherein a microphone detects audio waves that may include a wakeword. The detected audio waves may be described as input audio data to the local device. The input audio data may include the detected wakeword followed by a command, both uttered by a user. Once the initial wakeword is detected, the local device may transmit input audio data including to the command to a remote device (such as a server) for processing. The audio data including the command may be processed and output audio data may be generated as a result of the processing. The output audio data may then be transmitted to the local device. The local device may receive the output audio data from the server. The local device may also receive instructions to disable a first (primary) wakeword detector to avoid wakeword detection when output audio is output from the device (e.g., output as an audio wave from speakers, etc.). Disabling the first wakeword detector may comprise sending an instruction to the first wakeword detector to not process the audio data immediately following the wakeword detected in the input audio data.

In another embodiment, the local device may include a second (secondary) wakeword detector to detect a wakeword in the output audio data before it is output from a speaker of the local device. The second wakeword detector may receive the output audio data from the remote device (server) via the network. Upon receipt of the output audio data, the second wakeword detector may determine that the output audio data includes the wakeword. In response to determining that the output audio data includes the wakeword, the second wakeword detector may send data corresponding to instructions to the first wakeword detector, wherein the instructions are to ignore the incoming wakeword. In other words, the instructions to ignore the incoming wakeword may disable the first wakeword detector during a time interval in which the wakeword will be output from the speaker as part of the output audio data.

In some aspects, the local device may record and/or store in a buffer, portions of the output audio data that is generated and output from the remote device. The output audio data may include the wakeword, which may be determined by the second wakeword detector. Similarly, only portions of the output audio data may be captured and analyzed by the secondary wakeword detector to determine if the wakeword is present in those portions. For example, comparison of only small portions of the output audio data may be sufficient to determine if an inadvertent wakeword is present in the output audio data.

Other techniques may also assist in preventing a local device from responding to an inadvertent wakeword and/or executing an inadvertent command. For example, the output audio data generated by the remote device may also be configured to include an audio signal (for example a signal inaudible to humans) that indicates to a local device that the output audio data includes a wakeword and the wakeword is an inadvertent wakeword that the device should disregard. For example, every instance of the wakeword in output audio data may include a signal or indicator that immediately precedes the wakeword or precedes the wakeword by an amount of time in order to be detected before the wakeword can be detected. The signal may be an electronic signal that may only be detected by a computing device. Once the electronic signal is detected by a computing device, the computing device may transmit data to the local device instructing the local device to disable wakeword detection during a time interval when the wakeword will be output from the audio output speakers connected to the local device. Other techniques are also possible. The local device may also be referred to as a speech controlled device.

In yet another embodiment, the first wakeword detector may be enabled during the first time interval if the first detector detects a user-generated wakeword immediately before the first time interval. For example, the local device may receive output audio data from the remote device, where the output audio data includes the wakeword. The second wakeword detector may determine that the output audio data includes the wakeword and instruct the first wakeword detector to ignore the wakeword during the first time interval, that is, when the wakeword is output from speakers that will produce audio detectable by the microphone of the local device (e.g., speakers that are connected to the local device). During the time interval in which the first wakeword detector is disabled, a user-generated wakeword may be uttered with the intent to control the local device. However, since the first wakeword detector, which is configured to detect user-generated wakewords via the microphone, is disabled, the local device will not respond to the user-generated wakeword. In this example embodiment, the first wakeword detector will disregard the disable wakeword detection instruction if a user-generated wakeword is uttered and detected immediately prior to the first time interval in which the first wakeword detector will be disabled. In this manner, if a user should utter a wakeword prior to when the output audio data would result in the machine generated wakeword, the system would still be able to capture and process the user generated wakeword if uttered prior to the window in which the primary wakeword detector would be disabled. This embodiment allows the user to remain in full control of the local device even during temporary periods of disabling wakeword detection by the first wakeword detector. A user-generated wakeword may be a wakeword uttered by a user and not generated by a machine or computing device.

FIG. 1 shows a speech processing system 100 capable of capturing and ignoring inadvertent wakewords. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 and local to user 5, as well as one or more networks 199 and one or more servers 120 connected to speech-controlled device(s) 110 across network(s) 199. The server(s) 120 (which may be one or more different physical devices) may be capable of performing traditional speech processing (e.g., ASR, NLU, command processing, etc.) as described herein. A single server 120 may perform all speech processing or multiple servers 120 may combine to perform all speech processing. Further, the server(s) 120 may execute certain commands, such as answering spoken utterances of the user 5. In addition, certain speech detection or command execution functions may be performed by the speech-controlled device 110.

In one example, as shown in FIG. 1, a speech-controlled device 110 may capture input audio 11 of a spoken utterance from user 5 via a microphone 103 of the speech-controlled device 110. The speech-controlled device 110 may send input audio data 111 corresponding to the input audio 11 to the server 120 for processing. Alternatively, a separate microphone array (not illustrated) may capture the input audio 11. In an example, the microphone array is in direct communication with the speech-controlled device 110 such that when the microphone array captures the input audio 11, the microphone array sends input audio data corresponding to the input audio 11 to the speech-controlled device 110. In another example, the microphone array is in indirect communication with the speech-controlled device 110 via a companion application of a mobile computing device (not illustrated), such as a smart phone, tablet, laptop, etc. In this example, when the microphone array captures the input audio 11, the microphone array sends input audio data corresponding to the input audio 11 to the companion application, which forwards the input audio data to the speech-controlled device 110. Upon receiving the input audio data from the microphone array, the speech-controlled device 110 may forward the input audio data to the server 120 for processing. In yet another example, the microphone array is in indirect communication with the server 120 via the companion application such that when the microphone array captures the input audio 11, the microphone array sends input audio data corresponding to the input audio 11 to the companion application, which forwards the input audio data to the server 120 for processing.

The local device 110 may be configured to receive and respond to wakewords and execute audible commands in conjunction with server 120. The local device 110 may include a first detector (primary wakeword module) 220a to detect a wakeword in audio data detected by the microphone 103. The local device 110 may also include a second detector (secondary wakeword module) 220b to detect a wakeword in output audio data to be output from a speaker 101 of the local device 110. The first detector and the second detector may be enabled or disabled at different times and for specific lengths of time. While the local device 110 is listening for the wakeword, a user 5 may say the wakeword and say a command following the wakeword. The local device 110 may detect the wakeword, illustrated as block 132, as uttered by the user or any other audio source within the range of the local device's microphone 103. The local device 110 may then transmit (134) audio of the detected wakeword and/or data corresponding to the command to the remote device 120 via the network 199.

Prior to executing the command or in parallel to executing the command, the local device 110 may send (134) input audio data to the server(s) 120 for verification of the wakeword and/or command. The remote device 120 may perform processing of a command included in an utterance, wherein the audio data may include data corresponding to the detected wakeword and the audible command. The server 120 may receive (136) the input audio data of the detected wakeword and/or command, and processes (138) the audio data. The processing may include, as described below in reference to FIG. 2, performing ASR, NLU and executing instructions corresponding to the command (such as with a command processor 290) and generating (140) results corresponding to audio data from the command. Generating a result(s) may include obtaining data or media content in the form of output audio data corresponding to the command, wherein the output audio data may be audibly played from a media player or other device capable of processing the media content to be output from speakers or viewed on a display. It may be determined that the result output audio data includes the wakeword (142). Determining that the result audio data includes the wakeword may be performed in a number of ways, including analyzing the generated results in the form of output audio data to detect the presence of a wakeword, which will be further described below. In certain circumstances the server 120 may be configured to determine (142) that the result includes the wakeword, but the server may not necessarily be configured to do so in all cases (in which case the primary wakeword disabling may occur on the part of the local device 110 as explained below). Either way, the server 120 may then cause (144) the output audio data to be transmitted to the local device for delivery to the user 5. The local device 110 may receive (146) the output audio data. If the server is configured to determine (142) that the result includes the wakeword, it may also send the local device 110 data indicating that the output audio data includes the wakeword along with potential timestamps or other data indicating where in the output audio data the wakeword can be found so that the local device 110 may disable a primary wakeword detector (see below at 148) prior to when the wakeword would be output as part of the output audio data.

In certain configurations, the command resulting from the utterance may result in audio data being obtained from a device other than server 120. For example, if the user asks the system to play music from a third party service, or to play a news briefing from a third party news service, the server 120 may coordinate between a third party device (such as application server 125) so that output audio data may be sent from a third party device to the speech controlled device 110. This may occur by sending to the local device 110 a link (either sent from the server 120 or the application server 125) that the device 110 may use to access a stream of audio data from the application server 125 or another source. Thus, the server 120 may cause (144) output audio data to be transmitted to the local device 110 by either sending the output audio data directly to the local device 110 or by executing instructions to have output audio data sent to the local device 110 from a different device.

Once the output audio data is received by the local device 110, a second detector or secondary wakeword detector may detect a wakeword in the output audio data (147). In other words, the second wakeword detector may determine that a wakeword is included in the output audio data (147) by performing processing on the output audio data and detecting data corresponding to the wakeword.

In this example, the remote device 120 may determine that the output audio data, including the wakeword, corresponds to an advertisement that was broadcast via a television network. Thus, the remote device 120 may send an instruction to the local device 110 instructing the local device 110 to disable the first wakeword detector to avoid wakeword detection when the result output audio data is output from the speaker 101 (148). The local device 110 may then receive the instruction and disable wakeword detection during a time interval in which the wakeword will be output from the speaker 101. Once the wakeword containing portion of the result output audio data has been output from the speaker 101, wakeword detection may be enabled again. The local device 110 may enable the first wakeword detector after the wakeword containing portion of the result is output from the speaker 101 (150).

In another example, the user 5 maybe watching television and a broadcast, advertisement, or other television program may utter the wakeword, wherein the wakeword will be projected through speakers 101 of the television. As illustrated, the wakeword in this instance does not originate from the user 5 intending to control the local device 110, but rather from some program or other media being audibly played or output audio from speakers within vicinity of the local device 110. In this instance, the local device 110 may, using a second detector, detect the wakeword before it is output through the speaker 101.

In an embodiment, the local device 110 may, on its own, process the wakeword to determine whether the wakeword is inadvertent without sending the audio to the remote device 120. In this embodiment, the local device 110 may have a local storage component (or access to a remote storage component), where the storage component stores audio files or other data (such as data regarding the embedded signal inaudible to humans) that the local device 110 may use to determine if the wakeword is inadvertent. Thus, either the local device 110 or the remote device 120 may include the components to determine whether a wakeword is inadvertent.

Figure 2:
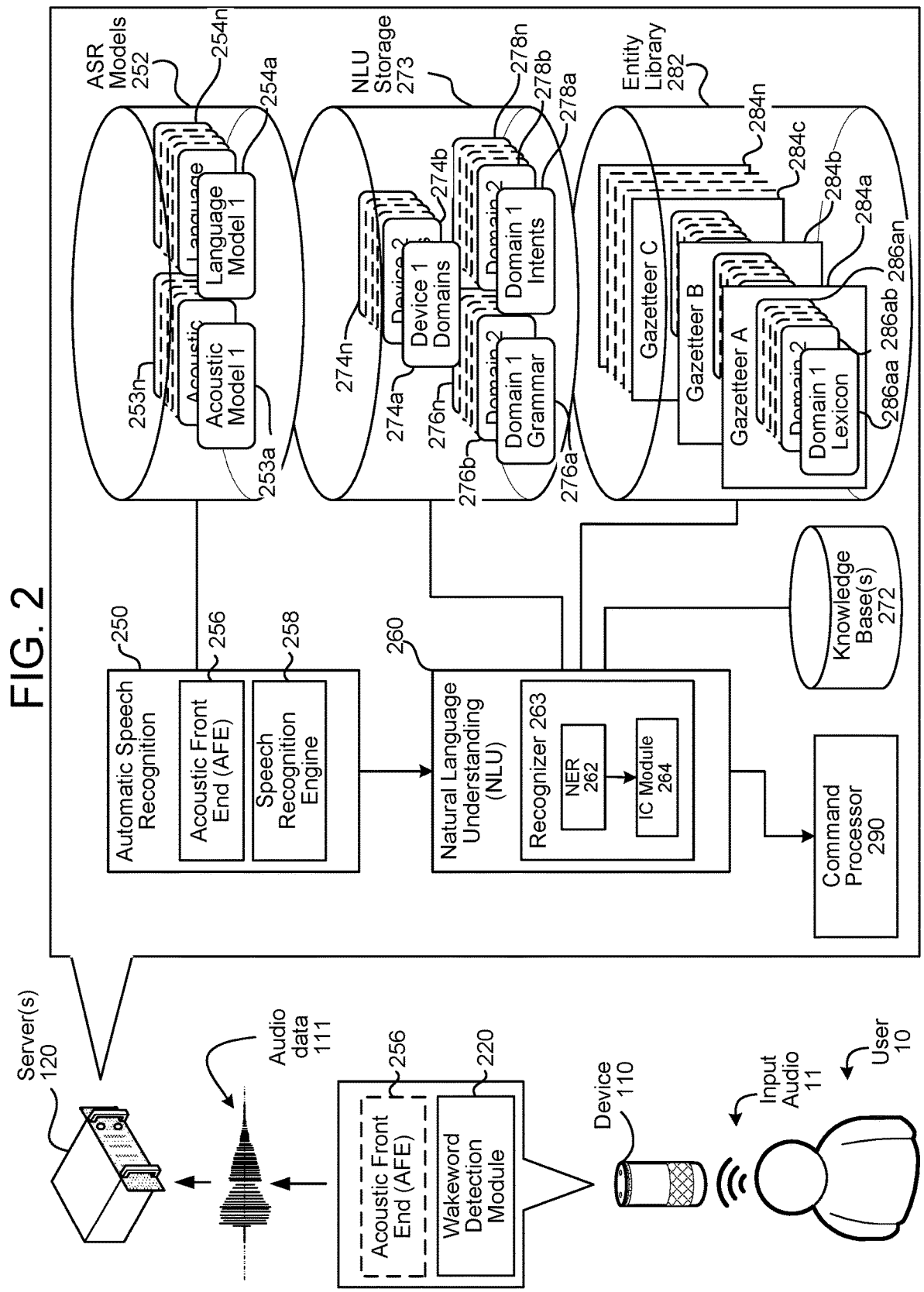
FIG. 2 is a conceptual diagram of how a spoken utterance may be processed according to embodiments of the present disclosure.

Further details of the speech-processing system 100 including the multi-stage wakeword detection are explained below, following a discussion of the overall speech processing system of FIG. 2. It is important to note however, that the anaphora-related resolution techniques discussed herein may apply not only to spoken queries and commands but also to commands/queries received from a text based input, such as a keyboard, touchscreen etc. Thus, while the present application describes anaphora resolution with respect to a speech-processing system, the present techniques may be applicable to other systems as well. The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone of the speech-controlled device 110 (or other device), captures input audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device 110, for example a microphone (not illustrated) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

Upon receipt by the server(s) 120, an ASR module 250 may convert the audio data 111 into text. The ASR module 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR module 250 may compare the audio data 111 with models for sounds (e.g., subword units, phonemes, etc.) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR module 250 outputs the most likely text recognized in the audio data 111. The ASR module 250 may also output multiple hypotheses in the form of a lattice or an N-best list with each hypothesis corresponding to a confidence score or other score (e.g., such as probability scores, etc.).

The device or devices including the ASR module 250 may include an AFE 256 and a speech recognition engine 258. The AFE 256 transforms the audio data 111, captured by the microphone 103, into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post front-end processed data (e.g., feature vectors) may be received by the device executing ASR processing from another source besides the internal AFE 256. For example, the speech-controlled device 110 may process audio data 111 into feature vectors (e.g., using an on-device AFE 256) and transmit that information to the server 120 across the network 199 for ASR processing. Feature vectors may arrive at the server 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 250 will output speech results that make sense grammatically.

The speech recognition engine 258 may use a number of techniques to match feature vectors to phonemes, for example using Hidden Markov Models (HMIs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.)

The device performing NLU processing 260 (e.g., server 120) may include various components, including potentially dedicated processor(s), memory, storage, etc. As shown in FIG. 2, an NLU component may include a recognizer 263 that includes a named entity recognition (NER) module 262 which is used to identify portions of query text that correspond to a named entity that may be recognizable by the system. A downstream process called named entity resolution actually links a text portion to an actual specific entity known to the system. To perform named entity resolution, the system may utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 250 based on the utterance input audio 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom" (which may involve a downstream command processor 290 linked with a telephone application).

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 272.

To correctly perform NLU processing of speech input, an NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 262 receives a query in the form of ASR results and attempts to identify relevant grammars and lexical information that may be used to construe meaning. To do so, the NLU module 260 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, or Household ID, or some other indicator.

In NLU processing, a domain may represent a discrete set of activities having a common theme, such as "shopping", "music", "calendaring", etc. As such, each domain may be associated with a particular recognizer 263, language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result. This is described further in detail below in reference to FIG. 3.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278. Traditionally, the determination of an intent by the IC module is performed using a set of rules or templates that are processed against the incoming text to identify a matching intent.

In order to generate a particular interpreted response, the NER 262 applies the grammar models and lexical information associated with the respective domain to actually recognize a mention one or more entities in the text of the query. In this manner the NER 262 identifies "slots" (i.e., particular words in query text) that may be needed for later command processing. Depending on the complexity of the NER 262, it may also label each slot with a type of varying levels of specificity (such as noun, place, city, artist name, song name, or the like). Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. Each slot/field corresponds to a portion of the query text that the system believes corresponds to an entity. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 262 may parse the query to identify words as subject, object, verb, preposition, etc., based on grammar rules and/or models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the knowledge base 272). So for instance, if the query was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text, commands, etc.) may then be sent to a command processor 290, which may be located on a same or separate server 120 as part of system 100. The system 100 may include more than one command processor 290, and the destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech. In certain examples, the command corresponding to the utterance may result in output audio data being sent to a local device 110 (or other output device) from a source other than server 120, such as application server 125 or the like.

Figure 3:
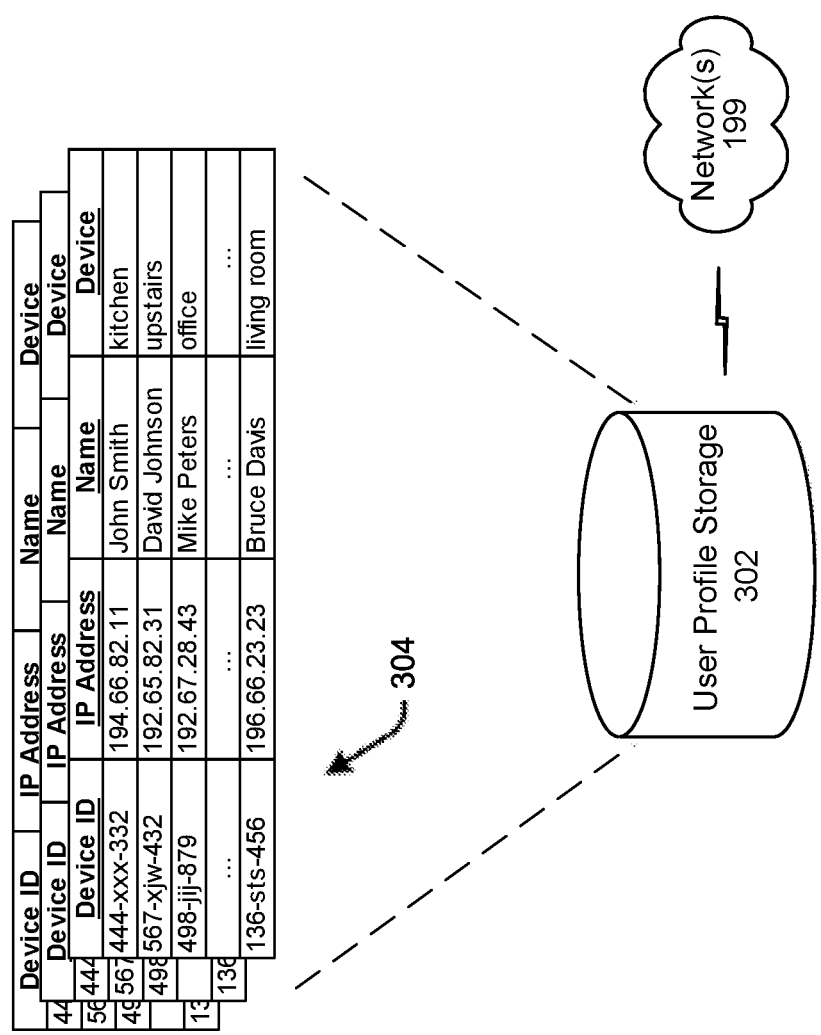
FIG. 3 illustrates data stored and associated with user profiles according to embodiments of the present disclosure.

FIG. 3 illustrates a user profile storage 302 that includes data regarding user accounts 304 as described herein. The user profile storage 302 may be located proximate to the server 120, or may otherwise be in communication with various components, for example over the network 199. The user profile storage 302 may include a variety of information related to individual users, accounts, etc. that interact with the system 100. For illustration, as shown in FIG. 3, the user profile storage 302 may include data regarding the devices associated with particular individual user accounts 304. In an example, the user profile storage 302 is a cloud-based storage. Each user profile 304 may include data such as device identifier (ID) data, speaker identifier (ID) data, voice profiles for users, internet protocol (IP) address data, name of device data, and location of device data for different devices. In addition, while not illustrated, each user profile 304 may include data regarding the locations of individual devices (including how close devices may be to each other in a home, if the device location is associated with a user bedroom, etc.), address data, or other such information. Data included in each user profile 304 may correspond to the primary wakeword detector and/or the secondary wakeword detector to determine whether or not a wakeword is included in output audio data. The output audio data may be generated and transmitted from a remote device via a network(s) 199.

As noted above, if a speech processing system is configured to process commands following a wakeword (such as "Alexa"), the system function improves when the wakeword detection is operational. That is, the system function improves when desired wakewords are detected/processed and inadvertent wakewords are ignored. To address the problem of detecting and not missing any deliberate wakewords many systems may be configured such that the wakeword detection module 220 of the system is tuned aggressively, so that few wakewords are missed. One problem with such tuning is false positives (i.e., detecting a wakeword when one was not spoken). Another problem is detecting inadvertent wakewords and treating them as intended wakewords (for example, treating a wakeword that was output by the system as a wakeword spoken by a user).

One technique for avoiding processing of audio that was output by the system by then also captured as input to the system is acoustic echo cancellation (AEC). In AEC, a device knows what audio data is being processed for output to its speakers, knows the positioning relationship between the device's audio speakers and microphones, and can thus, accounting for propagation and other delays, attempt to subtract the audio data that was sent to the device's speakers from the audio data captured by the device's microphones. AEC is not perfect, however, and even while performing AEC a device may not fully cancel out all audio and thus some remnants of the device's output audio may still remain after performing AEC on the input from the device's microphones. This means that if a wakeword was included in the audio data being sent to a device's speakers, some representation of that wakeword may still remain in uncancelled data following AEC processing. Further, if a device's wakeword detection module 220 (which may sit downstream from an AEC component), particularly if tuned aggressively, may still detect a wakeword in the post-AEC data. Thus, even for a system using AEC, or other audio processing techniques, further techniques may be needed to prevent inadvertent wakewords from being detected and processed, which may thereby interfere with proper system operation.

Referring to FIG. 4A, illustrated is an example scenario where an input utterance may result in output data that includes a wakeword, which when being played back may result in an undesired interruption to system operation. As illustrated, a microphone 103 may detect input audio 111 from a user 5 and transmit the input audio 11 to a wakeword detection module 220 for conversion to input audio data 111. Upon receipt of the input audio 111, the wakeword detection module 220 may determine if a wakeword is in the input audio 111. Upon detection of a wakeword in the input audio 11, the device 110 may convert the input audio 11 to input audio data 111 and transmit the input audio data 111 to a server(s) 120 via a network(s) 199. The input audio data 111 may include the wakeword and any further input audio uttered by the user 5 following the wakeword utterance. The server(s) 120 may receive the input audio data 111 via the network(s) 199 and perform processing (ASR, NLU, etc.) on the input audio data 111 to generate output audio data 151.

The output audio data 151 may be generated by an audio source 420 as a result of a command or request included in the input audio 111 uttered by the user 5. For example, the user 5 may utter a command or request for a news update or to play a song, and that command or request may be included in the input audio data 111 for processing by the server(s) 120. The news update or other audio corresponding to the command may include the wakeword, which may be embedded or included in the output audio data 151. The output audio data 151 may be transmitted to the speaker 101 via the network(s) 199. The output audio data 151 may be converted to audio waves and output via the speaker 101 as output audio 15. The output audio 15 may be broadcast out into the environment in which the microphone 103 may detect the output audio 15, wherein the output audio 15 includes the wakeword as generated by the audio source 420 or the server(s) 120. The wakeword detection module 220 may again determine that the wakeword is in the output audio data 151 and trigger an interruption to attempt to process a possible command following the wakeword, as described above. This is generally undesirable as only user uttered wakewords should result in an interruption to capture and process further audio data. Thus, the scenario as illustrated in FIG. 4A may not be desired.

Figure 4B:
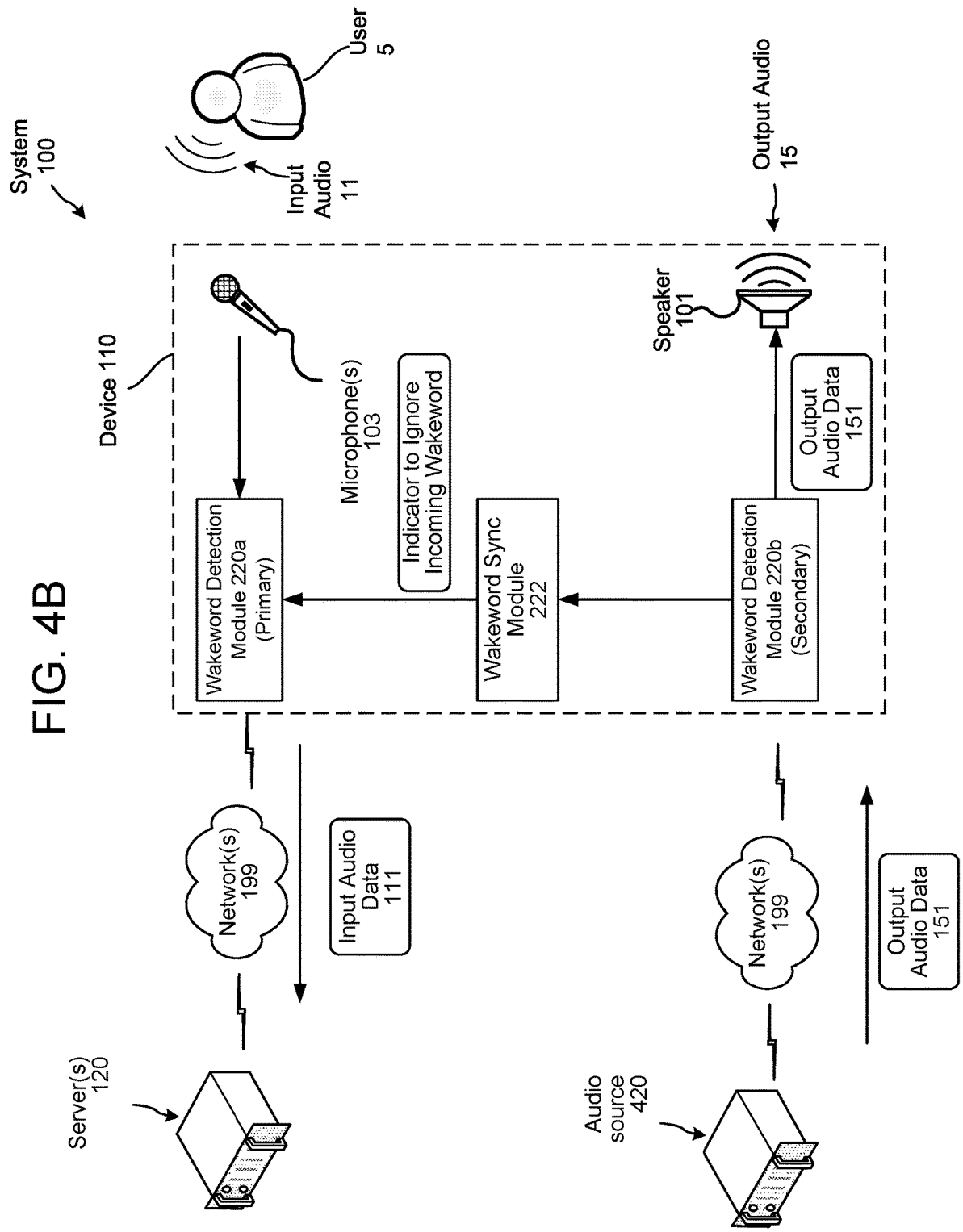
FIG. 4B illustrates an overview of a system to ignore a wakeword in output audio data before routing the output audio data to a speaker.

To avoid the scenario of FIG. 4A, referring to FIG. 4B, illustrated is a system 100 for detecting a machine-generated wakeword in machine-generated output audio data 151 and temporarily disabling a user generated wakeword detector (primary wakeword detector) 220a from detecting the machine-generated wakeword when the machine-generated wakeword is output to a speaker 101 and detectable by the user-generated wakeword detector 220a. The system 100 may include a machine-generated wakeword detector (secondary wakeword detector) 220b for detecting a machine-generated wakeword in output audio data 151 to be output as output audio 415 from a speaker 101.

In one embodiment, a microphone 103 may detect input audio 111 from a user 5 and transmit the input audio 111 to a primary wakeword detector 220a for conversion to input audio data 111. Upon receipt of the input audio 111, the primary wakeword detector 220a may determine if a wakeword is in the input audio 111. Upon detection of a wakeword in the input audio 111, the primary wakeword detector 220a may convert the input audio 111 to input audio data 111 and transmit the input audio data 111 to a server(s) 120 via a network(s) 199. The input audio data 111 may include the wakeword and any input audio 111 uttered by the user 5 following the wakeword utterance. The server(s) 120 may receive the input audio data 111 via the network(s) 199 and perform processing (ASR, NLU, etc.) on the input audio data 111 to generate output audio data 151. A wakeword synchronization module 222 may be in communication with the primary wakeword detection module 220a and the secondary wakeword detection module 220b to receive an indicator (such as a timestamp) of a wakeword occurrence in the output audio data 151 respectively. The primary wakeword detection module 220a and the secondary wakeword detection module 220b may also be configured to receive data corresponding to an indication of when the wakeword appears in input audio data 111 or in the output audio data 151. For example, the secondary wakeword detector 220b may determine when the output audio data 151 includes the wakeword. It may then identify the presence of and/or time of the wakeword in the output audio data. The wakeword synchronization module 222 may, based on wakeword timestamps, indicate to the primary wakeword detector 220a when to deactivate (and then reactivate) wakeword detection. In an example embodiment, the wakeword synchronization module 222 may generate an instruction to the primary wakeword detection module 220a to avoid detection of a wakeword at a specific time stamp or time interval when the secondary wakeword detection module 220b detects a wakeword generated by the audio source 420 or the server(s) 120.

In another example embodiment, the wakeword synchronization module 222 may be configured to receive inputs from the primary wakeword detection module 220a and the secondary wakeword detection module 220b and perform logical functions on the inputs to generate instructions to be transmitted to the primary wakeword detection module 220a and/or the secondary wakeword detection module 220b. The instructions may activate or deactivate primary wakeword detection module 220a at specific time periods and/or for specific time intervals. The time periods and/or time intervals may be based on time stamps received from the secondary wakeword detection module 220b, wherein the time stamps may correspond to an instance of a wakeword detected in output audio data 151. Based on the time stamps and the configuration of the device 110 (which may provide the wakeword synchronization module 222 with a priori knowledge of how long audio data takes from being received to being played by a speaker 101 to being recaptured as audio by the microphone 103), the wakeword synchronization module 222 may disable the primary wakeword detector during the time window the wakeword is likely to be detected. The time stamps may thus correspond to a delay in the detection of a wakeword. The time stamps may also be dynamic or static, wherein the time stamps may at different times in the input audio data 111 and the output audio data 151. The time stamps may also may be merged and/or manipulated by the wakeword synchronization module 222.

The output audio data 151 may be generated by an audio source 420 as a result of a command or request included in the input audio 111 uttered by the user 5. For example, the user 5 may utter a command or request for a news update or to play a song, and that command or request may be included in the input audio data 111 for processing by the server(s) 120. The news update or command may include the wakeword, which may be embedded or included in the output audio data 151 for transmission back to the user 5 to satisfy the command or request. The output audio data 151 may be transmitted to the secondary wakeword detector 220b via the network(s) 199. The secondary wakeword detector 220b may determine if a wakeword is in the output audio data 151. The secondary wakeword detector 220b may also determine a time interval of each instance the wakeword appears in the output audio data 151. For example, the secondary wakeword detector 220b may determine the wakeword appears at a first point corresponding to 3 seconds after the beginning of the output audio data 151 and the wakeword appearance may end at a second point corresponding to 4 seconds after the beginning of the output audio data 151 (or 1 second after the first point of the output audio data 151).

Upon detection of the wakeword in the output audio data 151 and determining the time interval of each wakeword appearance in the output audio data 151, the secondary wakeword detector 220b, wakeword synchronization module 222, and/or other component may send an indicator/signal to the primary wakeword detector 220a to ignore the incoming wakeword. For example, the indicator/signal to the primary wakeword detection module 220a may indicate the presence of the wakeword and exactly when and for how long the wakeword appears in the output audio data 151. Therefore, when the output audio data 151 is output from the speaker 101 and detectable by the microphone 103, the primary wakeword detector 220a will ignore the wakeword and not interrupt playback of the output audio data 151 from the speaker 101. As a result, the output audio data 151 is played for the listening pleasure of the user 5 without interruption. However, a wakeword uttered by the user 5 outside of the time interval(s) of which the wakeword appears in the output audio data 151 will not be ignored by the primary wakeword detector 220a.

Figure 5:
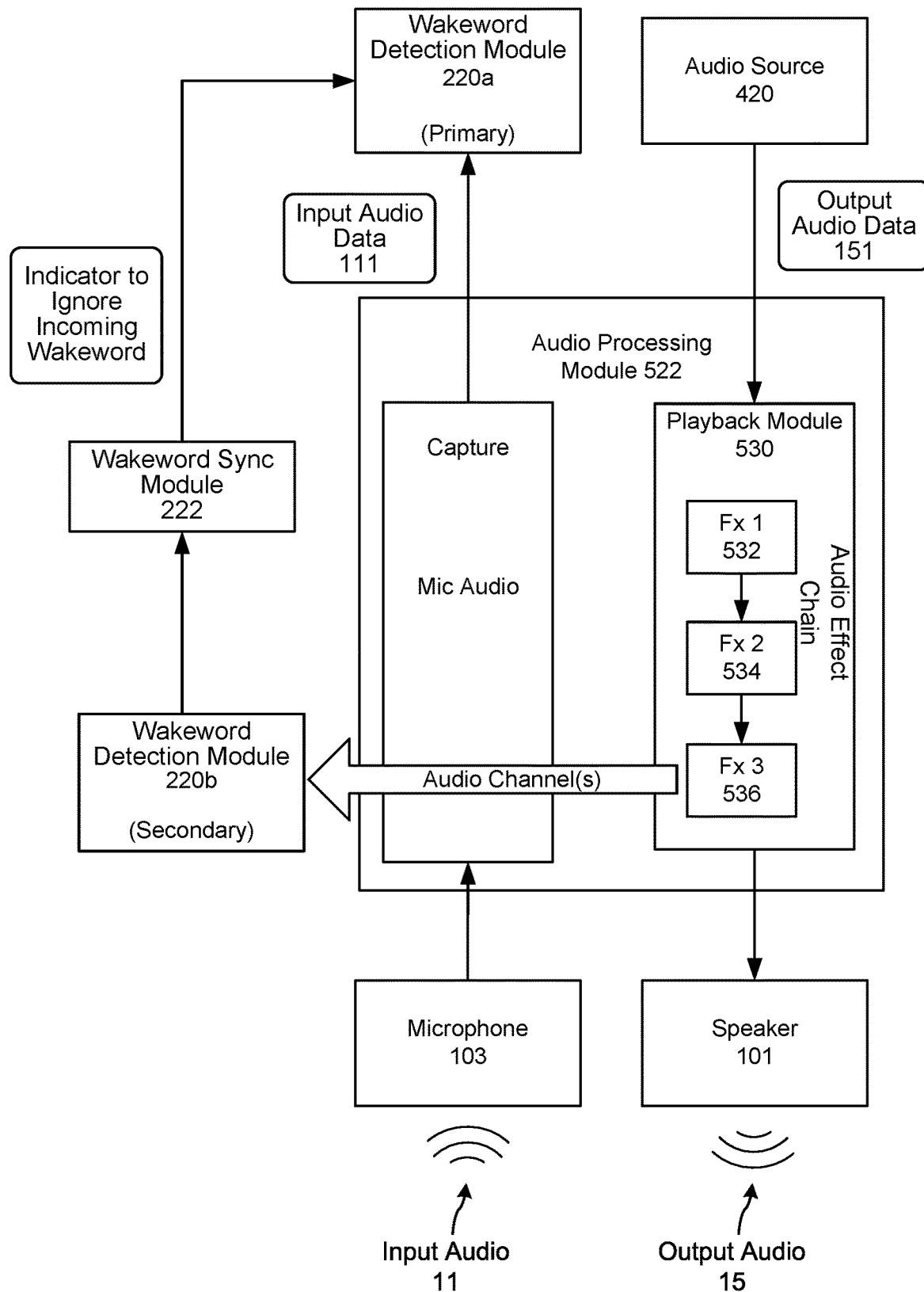
FIG. 5 is a conceptual diagram architecture for capturing audio data before routing the audio data to a speaker.

Referring to FIG. 5, components for detecting a wakeword and disabling wakeword detection are described. The illustrated components may reside in a local device 110, or in another device communicatively connected to microphone 103, speaker 101, and audio source 420. The components may include an audio processing module 522 to process audio data from a remote device or from an application or audio source 420. The components may also include a primary wakeword detector 220a in communication with a microphone 103 to detect a wakeword that is uttered by a user and received as the user's voice by the microphone 103. The microphone 103 may be configured to detect an utterance of a user 5 as audio waves and convert the audio waves (audio input 11) into input audio data 111. The input audio data 111 comprises data corresponding to the wakeword and any audio waves (audio input 11) immediately following the wakeword corresponding to a command or request uttered by the user 5. The primary wakeword detector 220a may be configured determine if the wakeword is included in the input audio data 111. The primary wakeword detector 220a determined wakeword appearance by processing (utilizing the processing methods described above herein) the incoming audio data 111 to detect a wakeword. As a result of the processing, and after determining that the input audio data 111 includes the wakeword, instructions/data corresponding to the input audio data 111 (e.g., a command from the server 120 after processing the utterance) may be transmitted to the audio source 420 for processing to generate a result that may include output audio data 151. The output audio data 151 may be transmitted to the playback module 530 for further processing to satisfy the command.

The playback module 530, which may include an audio equalizer or similar component may, include a plurality of effect components (Fx 1 532, Fx 2 534, Fx 3 536, and so on) that are configured to modify and/or manipulate audio data (output audio data 151) as the audio data passes through the plurality of effect components. Each one of the effect components may perform a unique function to be applied to the audio data. For example, a module may perform equalization, reverb, noise cancellation, noise suppression or any other functional effect on the audio data. Such effects may include treble boost (amplifying audio data, for example above 1 kHz), bass boost (amplifying audio data, for example, between 60-90 Hz, mid-range boost (amplifying audio data, for example between 400 Hz and 2.6 kHz), or a variety of known audio effects/functions. The effect components may also perform a function on the audio data wherein the audio data is not modified, but merely copied or passed through to another module of the playback module 530 or passed to another component external to the playback module 530. For example, after the audio data is manipulated through at least one effect component, the audio data may be copied and transmitted to one or more audio channels. The audio channel(s) may be monitored or accessed to determine its content or the identity of audio data present thereon. The audio channel may provide access to the output audio data 151 so it can be determined if the wakeword is included in the output audio data 151 without any framework level modifications to the output audio data 151.

The audio data processed by various system components may be in one of a plurality of formats. For example, audio data determined by the microphone 103 may be in a first format, which may be the format the wakeword detection modules 220 are configured to process. Output audio data 151 may be in a different format when it is sent to device 110. Thus, the audio processing module 522/playback module 530 may also be configure to perform a plurality of operations to convert, sample, re-sample, or down-sample the audio data, or otherwise convert the audio data between formats. For example, the input audio data 111 may be in a first format (such as a 16 kHz monochannel format) and the output audio data 151 may be in a second format (such as a 44.1 kHz, five channel format). The input audio data 111 and/or the output audio data 151 may be sampled at a rate corresponding to 16 kHz and a mono-channel at 16 bits per sample, little endian format. Audio data may be stored in a memory of a computing device. Audio data in little endian format corresponds to storing the least significant byte of the audio data in the smallest address, as opposed to big endian format where the most significant byte of the audio data is stored in the smallest address. Other examples of processing may include storage, level compression, data compression, transmission, enhancement (e.g., equalization, filtering, noise cancellation, echo, or reverb addition or removal, etc.). However, the audio data may be sampled at other rates and at other quality metrics to satisfy the specifications of the described embodiments herein.

The components of the device 110 (e.g., speaker 101, microphone 103, primary wakeword detection module 220a, secondary wakeword detection module 220b, wakeword synchronization module 222, etc.) may reside at different locations throughout the system 100. A system where the device components reside in locations external from the device 110 may be described as a distributed system. For example, the speaker 101 may be a wireless speaker in communication with the device 110, but not physically located within a structure of the device 110. Similarly, the microphone 103 may be a wireless microphone in communication with the device 110, but not physically located within a structure of the device 110. The same goes for each of the primary wakeword detection module 220a, secondary wakeword detection module 220b, and the wakeword synchronization module 222, may each be in communication with the device 110, but not physically located within the device 110. The flexibility of where each of these device components may be located may allow the distributed system to be configured in an arrangement that satisfies the specifications of the invention.

The secondary wakeword detector 220b may perform processing on the output audio data 151 to determine if the output audio data 151 includes the wakeword. The audio processing module 522 may be in communication with a secondary wakeword detector 220b to detect a wakeword that is included in output audio data 151 generated by a remote device (e.g., audio source 420) in response to the command or request in the input audio data 111 from the user 5. The audio processing module 522 may receive the output audio data 151 and perform multiple processing functions on the output audio data 151. The multiple processing functions may be executed by a playback module 530, as described above. A copy of the output audio data 151 may be provided to an audio channel to separately determine if the wakeword is in the output audio data 151 before the output audio data 151 is output to the speaker 101. Therefore, a wakeword presence determination is made before the output audio data is sent to the speaker 101 for transmission. This allows the audio processing module 522 to transmit the output audio data 151 to the secondary wakeword detector 220b via the audio channel(s).

The secondary wakeword detector 220b may detect the wakeword anywhere throughout the output audio data 151. For example, the wakeword may be detected in the beginning, middle or towards the end of the output audio data 151. The output audio data 151 may correspond to a sentence, song audio, song lyrics, news broadcast, or any other audio containing speech or words.

The audio processing module 522/secondary wakeword detection module 220b may also determine during which time interval the wakeword exists in the result. For example, once it is determined that the wakeword is included in the resulting output audio data 151, the secondary wakeword detector 220b may identify a time interval in which the wakeword appears. For example, the wakeword may be found at a first point corresponding to 3 seconds after the beginning of the output audio data and the wakeword may end at a second point corresponding to 4 seconds after the beginning of the output audio data (or 1 second after the first point of the output audio data). The wakeword may be found at any interval of time within a result comprising output audio data. The audio processing module 522/secondary wakeword detection module 220b may also determine a number of times the wakeword exists in the result and also determine a corresponding time interval at which the wakeword is present. The audio processing module 522 may delay the output of the output audio data to allow sufficient time for a determination to be made of whether or not the output audio data includes the wakeword.

Once a determination is made that the result, comprising the output audio data 151 from the server or audio source 420, includes a wakeword, the audio processing module 522 may generate and send instructions to the primary wakeword detector 220a to disable wakeword detection to avoid interruption of the result (output audio data 151 from the server or audio source 420) being broadcast from the speech-controlled device 110 (also referred to as the local device 110). Wakeword detection may be disabled by deactivating a microphone 103 connected to the speech-controlled device 110, wherein the microphone 103 may be configured to detect input audio 11 that may include a wakeword. Wakeword detection may also be disabled by executing instructions for the primary wakeword detector 220a to not respond when a wakeword is identified in a stream of output audio data 151 from the local device 110 via speakers 101. It should be appreciated that disabling wakeword detection can be performed in a number of different ways, as long as the identified wakeword fails to interrupt the device when the wakeword is output from the speakers of the local device.

To process the recording/captured wakewords and/or audible commands, the audio processing module 522 may employ audio fingerprinting techniques and other speech/audio comparison techniques. For example, the audio processing module 522 may use audio or acoustic fingerprinting techniques such as those described above. In this aspect, a digital summary of audio including an device generated wakeword and/or audible command may be generated based on frequency, intensity, time, and other parameters of potential instantiations of the wakeword. This digital summary may then be stored and compared to audio or acoustic fingerprints of incoming audio data to determine if the wakeword is detected.

The audio processing module 522 (including the wakeword detectors 220) may use various wakeword/keyword detection techniques such as those described above using HMIs, GMMs, LVCSR, etc.

Figure 6:
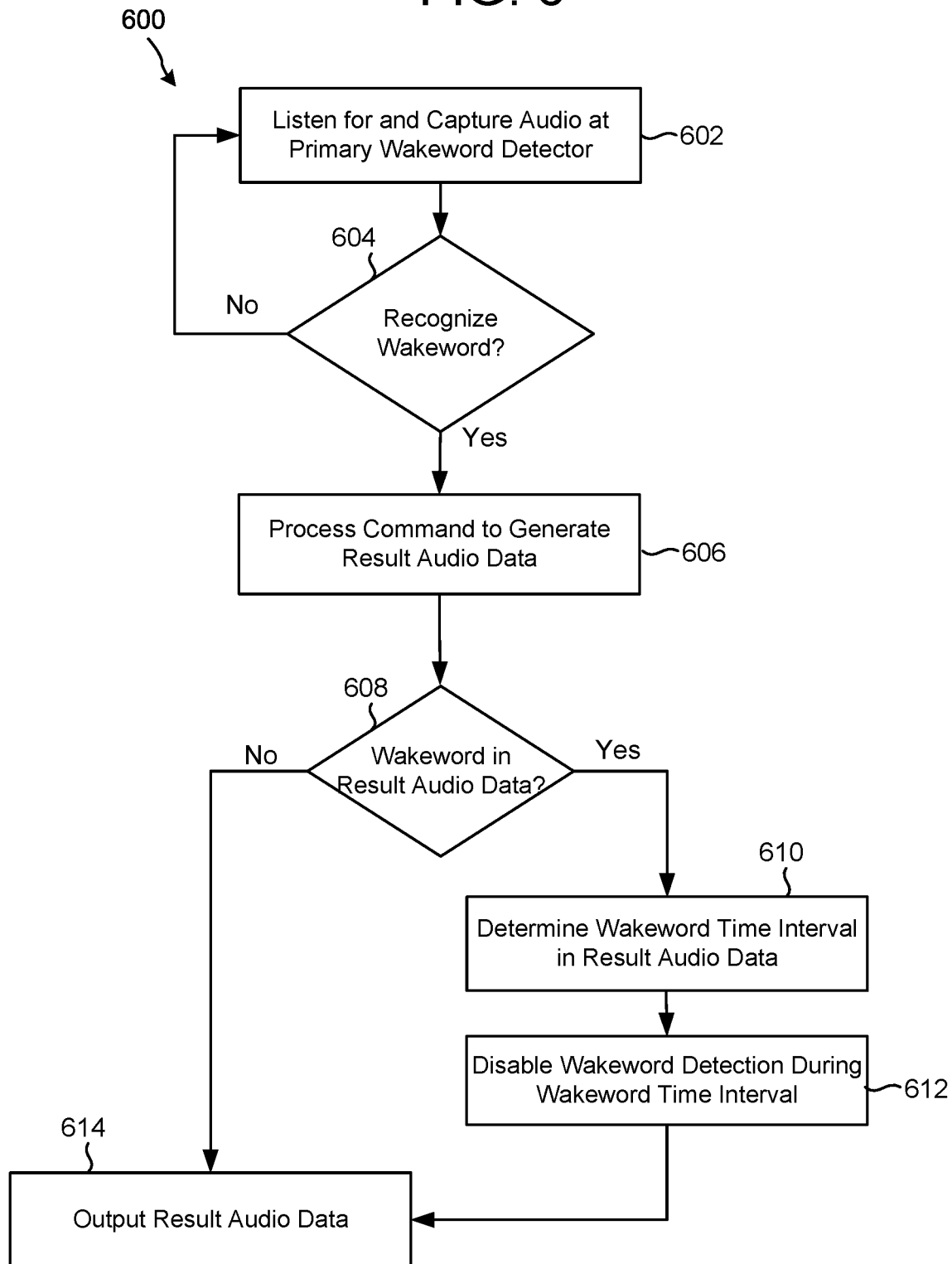
FIG. 6 illustrates an exemplary method of detecting device generated wakewords and audible commands according to embodiments of the present disclosure.

In an exemplary embodiment, audio fingerprinting techniques and/or speech model techniques may be used to identify and detect device-generated wakewords. A method 600 of detecting a device-generated wakeword is described with reference to FIG. 6. As illustrated in block 602, the method may include steps to listen for and capture audio via a primary wakeword detector. The audio captured from the primary wakeword detector may include a wakeword spoken or uttered by a user within vicinity of a microphone connected to a local device. In other words, the primary detector may be configured to detect and/or capture a wakeword produced by a source external to the local device. The captured wakeword and following command (also known as utterances) may be recognized (604) to determine if the wakeword is a valid input and perform processing on a consecutive command corresponding to an action recognizable by the system. The wakeword and/or command may be compared to data, wherein the data may be audio fingerprints, speech models, and other data corresponding to other audio processing techniques. These known utterances may include utterances of wakewords and/or audible commands in television and/or radio advertisements, programs, broadcasts, etc. In an example, the data may be audio fingerprints, i.e., condensed summaries of audio signals that can be used to identify an audio sample. The audio fingerprints may be generated by analyzing one or more of frequency, intensity, and other parameters of audio containing the inadvertent wakeword and/or audible command that can be used later to identify whether captured audio matches the audio of the program. In another example, the data may be speech models generated by analyzing audio containing the device generated wakeword and/or audible command, and preparing a model that can be compared against captured utterances of wakewords and/or audible commands to determine whether a captured utterance of a wakeword and/or audible command is a device generated wakeword and/or audible command. The data may be generated by the local device and/or the remote device. For example, the remote device may generate the data ahead of time (for example, before the program in question is broadcast) and may store the data in a manner accessible to the remote device. The remote device may also send such data to the local device to allow the local device to compare captured utterances to the data.

In another example, the local device may listen for and capture audio (602). It may then be determined (604) whether the captured audio includes a wakeword and/or audible command. The determination of whether the captured audio includes a wakeword and/or audible command may be performed using various audio processing techniques. Such techniques may be flexible, in that the detection of a wakeword and/or command may be performed and recognized no matter who speaks the wakeword and/or command or whether the wakeword and/or command is being transmitted through a speaker of a device.

When no wakeword and/or audible command is recognized (604:No) in the captured audio, the method returns to block 602 and the local device listens for and captures audio. When a wakeword and/or audible command is recognized, the captured audio and/or data corresponding to the captured audio may then be compared (604) to one or more of the data corresponding to one or more of the known utterances of device generated wakewords and/or audible commands, to determine whether the captured audio substantially corresponds to a known utterance of a device generated wakeword and/or audible command. For example, a score relating to the captured audio matching a known utterance of a device generated wakeword and/or audible command may be generated and compared to a configurable threshold value. The threshold value may be, for example, a 90% match, a 95% match, or other value corresponding to a substantial match.

Further, the determination as to whether the captured audio substantially corresponds to a known utterance of a device generated wakeword and/or audible command may incorporate one or more additional criteria. For example, whether the local device is in a standby or power save mode prior to detecting the wakeword and/or audible command, whether the local device is in an active mode or was recently used (such as within the last 1-5 minutes/seconds, etc.) when the wakeword and/or audible command is detected, how long it has been since a wakeword and/or audible command was detected and executed by the local device, one or more of the additional methods described herein, etc. to determine whether the captured audio substantially corresponds to a known utterance of a device generated wakeword and/or audible command.

When the wakeword and/or command is recognized (604: Yes), the command may be processed (606) to generate a result comprising audio data. For example, the command may be processed and return a result that is media content as output audio data. In other words, the result may be a video and audio media file to be rendered on a display of the local device and/or audio waves to be output from speakers in communication with the local device. Media content, for example, may be a news broadcast, an online video, a musical work, etc.

A determination of whether or not a wakeword is present (608) in the returned result that includes output audio data. If the output audio data includes a wakeword (608:Yes), a time interval in which the wakeword exists in the result may be determined (610). For example, the wakeword may exist at a first time interval in the result, wherein the first time interval corresponds to an interval of 5 seconds to 8 seconds, beginning at 5 seconds from the beginning of the result to 8 seconds from the beginning of the result, when the result is played in real time. The wakeword may exist at multiple time intervals, for example at a first time interval and at a second time interval, etc.

Once a time interval of when the wakeword is present in the result output audio data is determined, wakeword detection may be disabled (612) during the wakeword time interval. For example, if the wakeword time interval is from 5-8 seconds in the output audio data, a secondary wakeword detector may be disabled only for that time interval. Such disabling of wakeword detection prevents the local device from being interrupted while the output audio data including the wakeword is undergoing playback to a user. In other words, the local device may output (614) the result output audio data via at least the speakers after the instruction to disable wakeword detection has been received and processed. Once the wakeword time interval has passed, and the wakeword has been output without being detected and interrupting playback of the result output audio data, wakeword detection may be enabled again to detect a true wakeword spoken or uttered by the user.

In another example embodiment, if a wakeword is detected in the output audio data 151, and the output audio data 151 is being transmitted to a remote speaker (e.g., Bluetooth speaker, wireless speaker connected to the device 110), a signal such as a beep or chirp (which may be inaudible to humans but detectable by devices) may be output from the local speaker 101 as an indication that an upcoming wakeword will be output soon thereafter. The microphone 103 (or other component) may detect the inaudible beep or chirp and transfer the indication to the primary wakeword detector 220*a*/wakeword synch module 222 to disable wakeword detection during a time interval in which the wakeword will be output from the remote speaker.

When the audio fingerprint of the command generated result substantially corresponds to the stored audio fingerprint of a device-generated (machine-generated) wakeword (i.e., the comparison is greater than/equal to the threshold) (604:Yes), the wakeword included in the result audio may be disregarded by proceeding to the step to listen for and capture audio at the primary wakeword detector (602). For example, as described above, the local device may be in a standby or power save mode and a device generated wakeword may be detected. In this example, the local device may detect the wakeword, determine the wakeword is device or machine-generated, disregard the wakeword and any following commands and proceed to continue listening for a user generated or user uttered wakeword.

Various machine learning techniques may be used to perform the training of the primary wakeword detector 220*a* and the secondary wakeword detector 220*b* or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 7 and 8, are exemplary, and may be located a stand-alone device or may be included, in whole or in part, as a component of a larger device or system.

Figure 7:
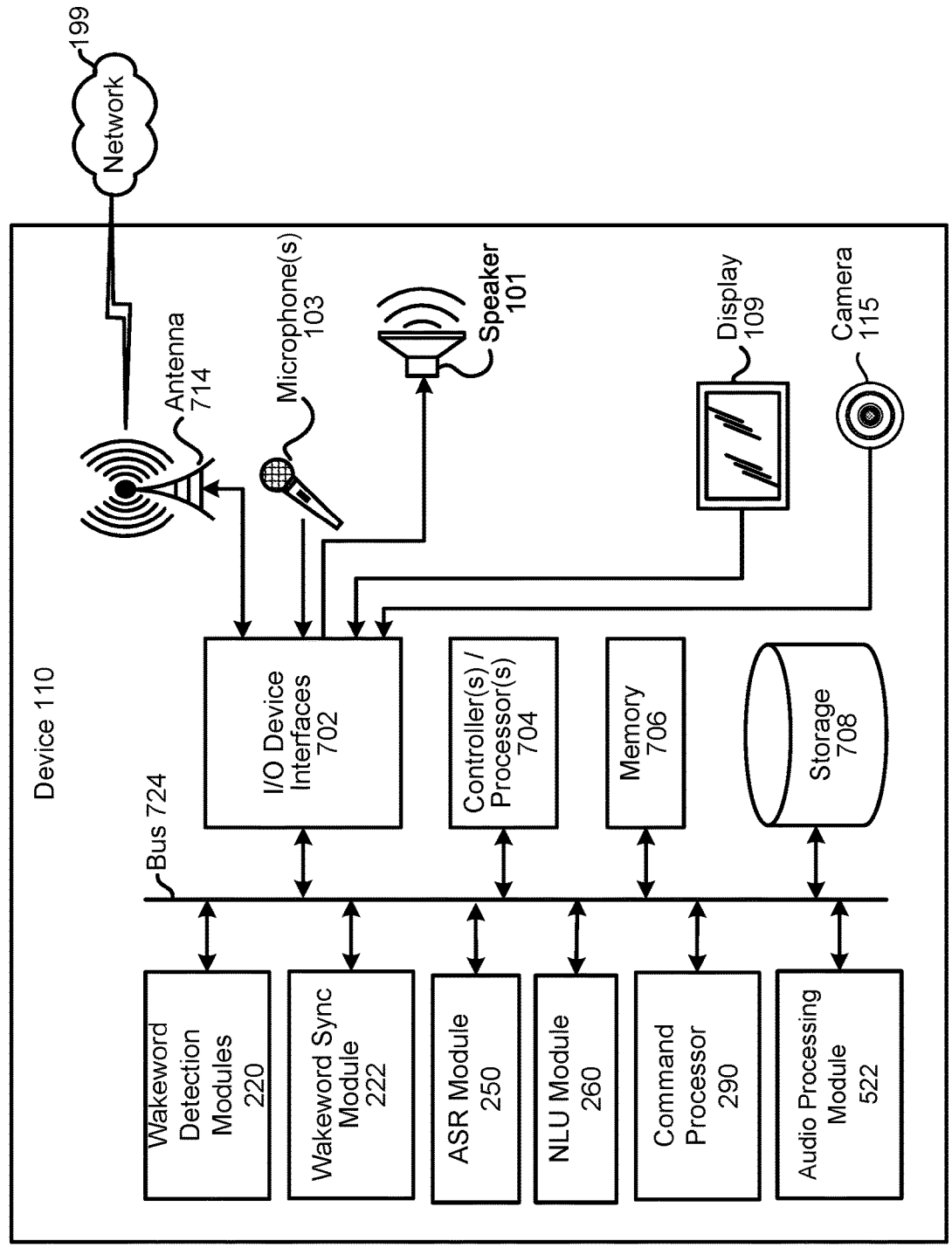
FIG. 7 is a block diagram conceptually illustrating example components of a device according to embodiments of the present disclosure.
Figure 8:
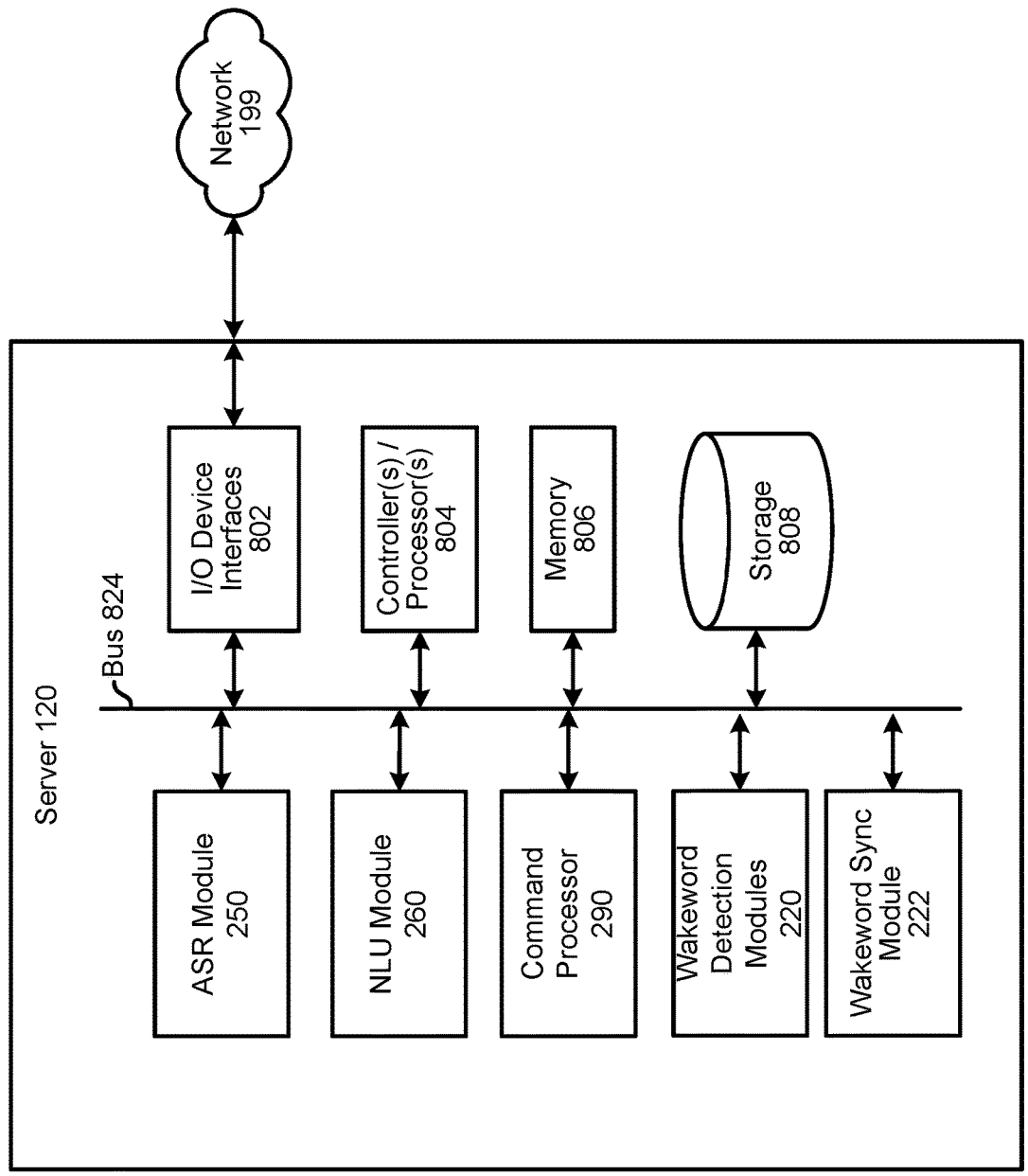
FIG. 8 is a block diagram conceptually illustrating example components of a server according to embodiments of the present disclosure.

FIG. 7 is a block diagram conceptually illustrating a user device 110 (e.g., the speech-controlled device 110 described herein) that may be used with the described system. FIG. 8 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (704/804), that may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive (MRAM) and/or other types of memory. Each device (110/120) may also include a data storage component (708/808), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces (702/802), as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as an audio output component such as a speaker 101, a visual output component such as a display 109, a wired headset or a wireless headset (not illustrated), or other component capable of outputting audio. The display 109 may output image and/or video data as described herein. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array.

For example, via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, etc. A wired connection such as Ethernet may also be supported. Through the network(s) 199, the speech processing system may be distributed across a networked environment.

The device 110 may include an audio processing module 522 and wakeword detection modules 220. The audio processing module 522 and wakeword detection modules 220 may perform the various functions described above. The primary wakeword detection module 220a may receive audio data captured by a microphone 103 (which itself may have been processed, for example by AEC, prior to reaching the wakeword detection module 220a). The secondary wakeword detection module 220b may receive audio data intended for speaker 101. The primary wakeword detection module 220a and secondary wakeword detection module 220b may be configured similarly, e.g., tuned to a similar level of wakeword-detection aggressiveness, or they may be configured differently, e.g. tuned to a similar level of wake-word-detection aggressiveness. In the later situation, one detector 220 may potentially detect a wakeword in audio data that the other detector 220 may not. This may be done in order to adjust system operation to a desired tradeoff, such as between missed positives and false positives.

The device 110 and/or the server 120 may include an ASR module 250. The ASR module 250 in the device 110 may be of limited or extended capabilities. The ASR module 250 may include the language models 254 stored in ASR model storage component 252. If limited speech recognition is included, the ASR module 250 may be configured to identify a limited number of words, whereas extended speech recognition may be configured to recognize a much larger range of words.

The device 110 and/or the server 120 may include a limited or extended NLU module 260. The NLU module 260 in the device 110 may be of limited or extended capabilities. The NLU module 260 may comprise the name entity recognition module 262, the intent classification module 264, and/or other components. The NLU module 260 may also include a stored knowledge base and/or entity library, or those storages may be separately located.

The device 110 and/or the server 120 may also include the command processor 290 configured to execute commands/functions associated with a spoken utterance as described herein.

The server may also include one or more wakeword detection modules 220, particularly if the server is configured to determine (142) if output audio data from the results includes a wakeword. If the server is so configured, the server 120 may also be configured to send (and the local device 110 configured to receive) an indication that the output audio data 151 includes a wakeword. The local device 110 may then use that indication similarly to an indication from a secondary wakeword detector 220b, and may in response disable a primary wakeword detector 220a for a period of time. The indicator from the server 120 in such a situation may thus be similar to an indicator output from a secondary wakeword detector 220b.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 7 and 8, are exemplary, and may be located as a stand-alone device or may be included, in whole or in part, as a component of a larger device or system.

Figure 9:
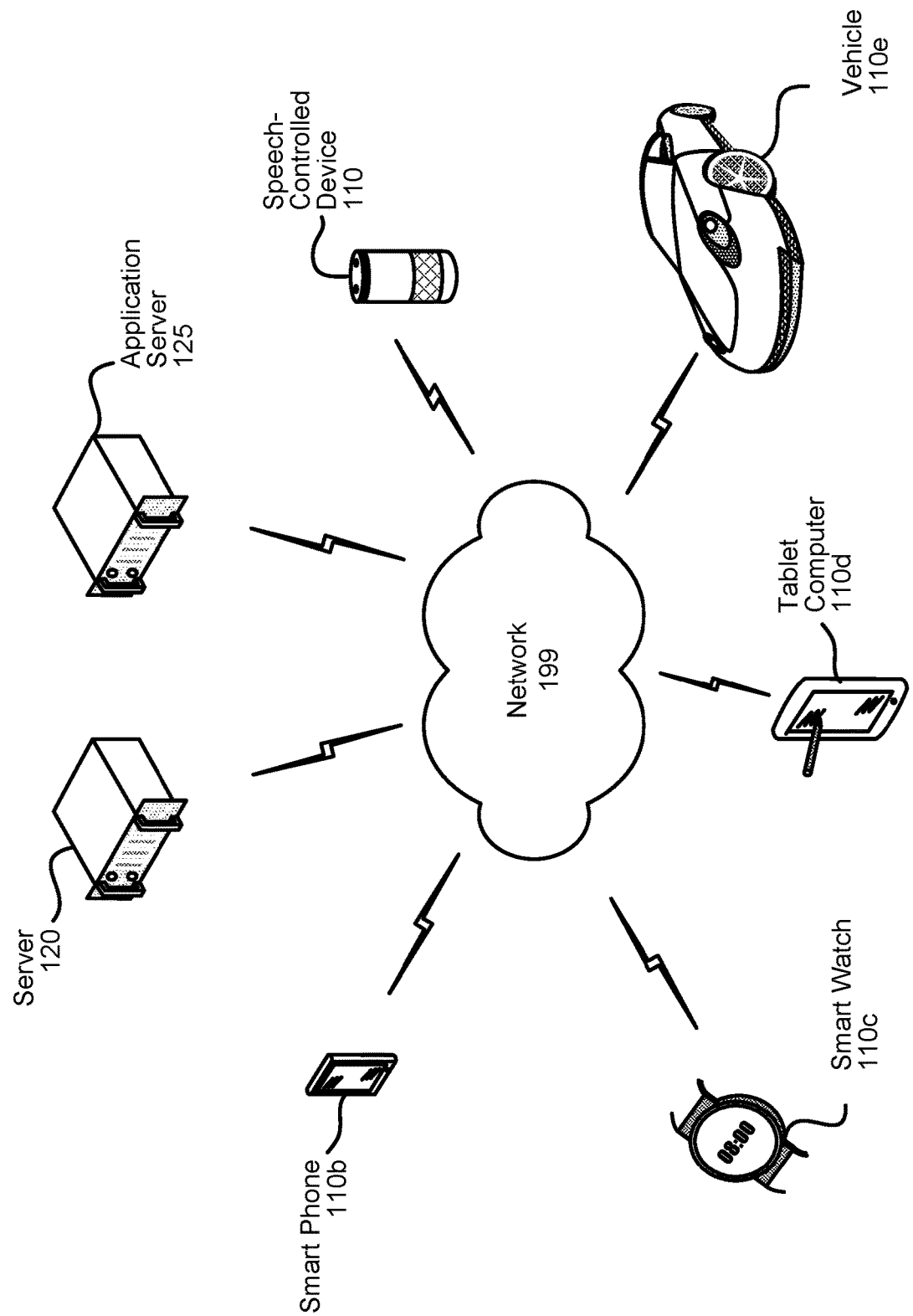
FIG. 9 illustrates an example of a computer network for use with the system.

As illustrated in FIG. 9, multiple devices (120, 110, 110b-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110, a tablet computer 110d, a smart phone 110b, a smart watch 110c, and/or a vehicle 110e may be connected to the network 199 through a wireless service provider, over a WiFi or cellular network connection, or the like. Other devices are included as network-connected support devices, such as the server 120, application developer devices (e.g., the application server 125), or others. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR module 250, the NLU module 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 256, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   determining first audio data corresponding to an output by a first device;
   determining, using a first detector of the first device, that the first audio data includes a first representation of a keyword;
   after determining the first audio data includes the first representation, adjusting operation with regard to a second detector of the first device, the second detector configured to determine whether second audio data includes a second representation of the keyword; and
   after adjusting the operation of the second detector, causing audio, corresponding to the first audio data, to be output by the first device.

2. The computer-implemented method of claim 1, wherein adjusting operation with regard to the second detector comprises disabling the second detector.

3. The computer-implemented method of claim 2, further comprising:
   determining the first representation will be output as a portion of the audio during a first time period; and
   enabling the second detector following the first time period.

4. The computer-implemented method of claim 1, wherein adjusting operation with regard to the second detector comprises ignoring output data of the second detector.

5. The computer-implemented method of claim 1, wherein the first device comprises a microphone and an audio output component, wherein the second detector is coupled to the microphone, and wherein the method further comprises:
   causing the first audio data to be sent to the audio output component.

6. The computer-implemented method of claim 5, further comprising:
   disabling the second detector prior to causing the first audio data to be sent to the audio output component.

7. The computer-implemented method of claim 1, wherein the first detector is configured to send an indicator to the second detector based at least in part on the first detector determining the first audio data includes the first representation, the indicator causing the second detector to ignore the second representation determined in second audio data corresponding to the audio.

8. The computer-implemented method of claim of claim 7, wherein the indicator prevents the second detector from ceasing output of the audio in response to determining the second representation.

9. The computer-implemented method of claim 1, further comprising:
   receiving the first audio data from a second device.

10. The computer-implemented method of claim 1, further comprising, prior to determining the first audio data:
    receiving input audio data;
    determining, using the first detector, that the input audio data represents the keyword; and
    causing speech processing to be performed based at least in part on the input audio data.

11. A first device, comprising:
    at least one processor; and
    at least one memory including instructions that, when executed by the at least one processor, cause the first device to:

determine first audio data corresponding to an output by a first device;
determine, using a first detector of the first device, that the first audio data includes a first representation of a keyword;
after determination that the first audio data includes the first representation, adjust operation with regard to a second detector of the first device, the second detector configured to determine whether second audio data includes a second representation of the keyword; and
after adjustment of the operation of the second detector, cause audio, corresponding to the first audio data, to be output by the first device.

12. The first device of claim 11, wherein the instructions that cause the first device to adjust operation with regard to the second detector comprise instructions that, when executed by the at least one processor, cause the first device to disable the second detector.

13. The first device of claim 12, wherein the at least one memory further includes instructions that, when executed by the at least one processor, further cause the first device to:
determine the first representation will be output as a portion of the audio during a first time period; and
enable the second detector following the first time period.

14. The first device of claim 11, wherein the instructions that cause the first device to adjust operation with regard to the second detector comprise instructions that, when executed by the at least one processor, cause the first device to ignore output data of the second detector.

15. The first device of claim 11, wherein the first device comprises a microphone and an audio output component, wherein the second detector is coupled to the microphone, and wherein the at least one memory further includes instructions that, when executed by the at least one processor, further cause the first device to:
cause the first audio data to be sent to the audio output component.

16. The first device of claim 15, wherein the at least one memory further includes instructions that, when executed by the at least one processor, further cause the first device to:
disable the second detector prior to causing the first audio data to be sent to the audio output component.

17. The first device of claim 11, wherein the first detector is configured to send an indicator to the second detector based at least in part on the first detector determining the first audio data includes the first representation, the indicator causing the second detector to ignore the second representation determined in second audio data corresponding to the audio.

18. The first device of claim 17, wherein the indicator prevents the second detector from ceasing output of the audio in response to determining the second representation.

19. The first device of claim 11, wherein the at least one memory further includes instructions that, when executed by the at least one processor, further cause the first device to:
receive the first audio data from a second device.

20. The first device of claim 11, wherein the at least one memory further includes instructions that, when executed by the at least one processor, further cause the first device to prior to determination of the first audio data:
receive input audio data;
determine, using the first detector, that the input audio data represents the keyword; and
cause speech processing to be performed based at least in part on the input audio data.

* * * * *